United States Patent
Ueda et al.

(10) Patent No.: US 7,298,566 B2
(45) Date of Patent: Nov. 20, 2007

(54) DATA STORAGE DEVICE AND CONTROL METHOD THEREFOR INVOLVING FLYING HEIGHT

(75) Inventors: Tetsuo Ueda, Kanagawa (JP); Kazuyuki Ishibashi, Kanagawa (JP); Satoshi Ishii, Kanagawa (JP); Masaaki Noguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 260 days.

(21) Appl. No.: 11/064,698

(22) Filed: Feb. 23, 2005

(65) Prior Publication Data

US 2005/0185312 A1    Aug. 25, 2005

(30) Foreign Application Priority Data

Feb. 25, 2004   (JP)   .............................. 2004-049284

(51) Int. Cl.
*G11B 27/36* (2006.01)
*G11B 21/02* (2006.01)
*G11B 15/12* (2006.01)

(52) U.S. Cl. .......................................... 360/31; 360/75
(58) Field of Classification Search ..................... None
See application file for complete search history.

(56) References Cited

U.S. PATENT DOCUMENTS

| | | | |
|---|---|---|---|
| 5,831,781 A * | 11/1998 | Okamura ..................... | 360/31 |
| 6,411,458 B1 | 6/2002 | Billings et al. | |
| 6,671,110 B2 * | 12/2003 | Baba et al. ..................... | 360/31 |
| 6,956,707 B2 * | 10/2005 | Ottesen et al. ................. | 360/25 |
| 6,987,628 B1 * | 1/2006 | Moline et al. ................. | 360/31 |
| 2002/0093753 A1 * | 7/2002 | Atsumi ..................... | 360/73.03 |
| 2002/0176195 A1 | 11/2002 | Fung et al. | |

FOREIGN PATENT DOCUMENTS

JP    2000-195210    7/2000

* cited by examiner

*Primary Examiner*—William Korzuch
*Assistant Examiner*—Jason Olson
(74) *Attorney, Agent, or Firm*—Townsend and Townsend and Crew LLP; Patrick Duncan

(57) ABSTRACT

Embodiments of the invention are directed to detecting an abnormality in head flying height. In one embodiment, an AGC controller establishes the gain of the reproduced signal through gain adjustment using the servo AGC of the servo signal. A digital filter performs filtering processing by use of the obtained gain data g and the gain data of previous sectors. A comparative judgment section obtains filtered gain data G from the digital filter and compares the gain data G with a reference value CRITERIA to determine whether the flying height is normal or abnormal. If the gain G is larger than the reference value CRITERIA, then the data write operation is inhibited. The filter parameters of the digital filter are programmable parameters which can be set and changed.

20 Claims, 14 Drawing Sheets

$$Gn = \sum_{i=n-p+1}^{n} An - i \times gi$$

$i = n - p + 1$
$(p = 5)$ n : CURRENT SECTOR
Ai : WEIGHTING FACTOR
gi : GAIN

Fig.13

| HEAD NUMBER | ZONE NUMBER | REFERENCE VALUE |
|---|---|---|
| 0 | 0 | $P_0$ |
|   | 1 | $P_1$ |
|   | ⋮ | ⋮ |
|   | n |   |
| 1 | 0 |   |
| ⋮ | ⋮ | ⋮ |

690

DATA STORAGE DEVICE AND CONTROL METHOD THEREFOR INVOLVING FLYING HEIGHT

CROSS-REFERENCES TO RELATED APPLICATIONS

This application claims priority from Japanese Patent Application No. JP2004-049284, filed Feb. 25, 2004, the entire disclosure of which is incorporated herein by reference.

BACKGROUND OF THE INVENTION

The present invention relates to a data storage device and a control method therefor, and more particularly to a data storage device which determines whether the flying height of each head is normal, and a control method therefor.

Known data storage devices use various types of media such as optical disks and magnetic tapes. Among these data storage devices are hard disk drives (HDDs), which have been widely used as storage for computers and are now essential storage devices in computer systems. Their applications, however, are not limited to computers. Due to their superior characteristics, HDDs have found application in an increasing number of fields. For example, they have been used in video recording/reproducing apparatuses and recording/reproducing apparatuses for car navigation systems and also used as removable storage (memory) for digital cameras.

A HDD comprises: at least one magnetic disk for storing data; at least one head device portion for writing/reading data to/from the magnetic disk; at least one slider to which the head device is fixed; and an actuator for holding the slider and moving the head device portion to a desired position over the magnetic disk. A voice coil motor rotates the actuator around a pivot so as to move the head in a radial direction over the rotating magnetic disk. This allows the head device portion to access a desired track formed on the magnetic disk to read/write data.

The actuator has a resilient suspension to which the slider is fixed. The pressure (to the head device portion) generated due to the viscosity of the air between the rotating magnetic disk and the ABS (Air Bearing Surface) surface of the slider facing the magnetic disk balances with the pressure applied (to the head device portion) by the actuator toward the magnetic disk, causing the head device portion to float above the magnetic disk with a certain gap therebetween. Such a gap between the head device portion and the magnetic disk is referred to as a head flying height.

In some cases, the head flying height becomes abnormally high while the HDD is operating. This phenomenon is considered to be attributed to thermal asperity on the magnetic disk, a disturbance in the air bearing due to dust, or an external shock. If the head device portion floats abnormally high, the level of the magnetic signal applied from the head device portion to the magnetic disk decreases. If a write operation is performed at that time, the data may be properly written, or no data may be written at all.

To prevent occurrence of such an error in a write operation, a technique has been proposed which detects the head flying height based on the servo gain and inhibits the data write operation when the flying height is abnormal (see Japanese Patent Laid-Open No. 2001-229637). In the HDD, the read signal read out from the magnetic disk is amplified to a certain potential through AGC (Automatic Gain Control). The level of the read signal read by the head device portion is inversely proportional to the head flying height. Therefore, the higher the flying height, the larger the gain of the AGC. The technique disclosed in Japanese Patent Laid-Open No. 2001-229637 monitors the gain of the AGC for amplification of the servo signal at the start of a write operation and compares its value with a reference value to detect an abnormality in the head flying height. If the flying height is determined to be abnormal, the technique inhibits the data write operation.

Japanese Patent Laid-Open No. Hei 09-139040 (1997) discloses a system for monitoring changes in the head flying height based on the AGC voltage of the AGC circuit of the data reproduction processing circuit which receives the reproduced signal obtained when data stored on a disk is read out by the head and which performs predetermined data reproduction processing. The CPU compares the input AGC voltage with threshold value data DT stored in memory, and if the voltage falls outside a permissible range, the CPU outputs a flying height change detection signal FS indicating occurrence of an abnormal change in the head flying height. Further, the system disclosed measures the AGC voltage CV corresponding to the reproduced signal from the head and compares an average value CVa of the AGC voltage CV with the threshold value data DT to determine whether the AGC voltage CV falls within a permissible range indicated by the threshold value data DT.

BRIEF SUMMARY OF THE INVENTION

The level of the reproduced signal of the servo signal, however, may change due to a change in the quality of the servo pattern regardless of the head flying height. However, the technique disclosed in Japanese Patent Laid-Open No. 2001-229637 determines whether the flying height is abnormal based on the AGC gain for a single servo pattern. Therefore, the technique may erroneously determine that the flying height is abnormal when it is normal, depending on a change in the level of the reproduced signal of the servo signal. This means that the write operation might be inhibited when data should be written, which is overkill.

The technique disclosed in Japanese Patent Laid-Open No. Hei 09-139040 detects an abnormality in the head flying height by comparing an average value of the AGC voltage and a threshold value. However, the AGC gain function which provides an appropriate AGC gain value (an appropriate average AGC gain value) to be compared with the threshold value varies depending on the HDD and how an abnormality in the flying height occurs. Therefore, it is necessary to easily set and change the AGC gain function. However, the above conventional technique cannot satisfy this requirement.

On the other hand, the head flying height changes with temperature. Specifically, the flying height increases with decreasing temperature. Accordingly, if the reference value to be compared with the AGC gain is set to a constant value based on a specific temperature, it may not be appropriate at other temperatures.

The present invention has been devised in view of the above problems. It is, therefore, a feature of the present invention to provide a technique for facilitating design for properly detecting the head flying height in each device. Another feature of the present invention is to provide a technique capable of properly detecting the head flying height regardless of temperature variations. These and other features of the present invention will become apparent from the specification and the accompanying drawings.

According to one aspect of the present invention, a data storage device comprises: a medium for storing data; and a head for floating above the medium and moving so as to access a storage area of the medium; wherein the data storage device determines whether a flying height of the head is normal; and wherein the data storage device further comprises: a flying height data generating section for generating flying height data based on a read signal read out from the medium by the head, the flying height data indicating the flying height of the head; a storage device for storing variable parameters; an evaluation value generating section for obtaining a plurality of pieces of flying height data generated by the flying height data generating section and processing the plurality of pieces of flying height data based on the parameters stored in the storage device to generate an evaluation value; and a determining section for determining whether the evaluation value is within a predetermined range. Thus, the data storage device generates the evaluation value by processing the plurality of pieces of flying height data based on the variable parameters, and determines whether the flying height is normal based on the evaluation value, making it easy to establish settings for each device. It should be noted that the predetermined range used by the determining section may be a range of values not less than a predetermined value, or a range of values not more than a predetermined value, or a range of values between predetermined values. This also applies to the data storage devices of the other aspects of the present invention described below.

The above data storage device preferably further comprises: a write control section for inhibiting a data write operation to the medium if the determining section has determined that the evaluation value is outside the predetermined range. Thus, the data write operation is inhibited in the above case, making it possible to prevent occurrence of a write error when, for example, the flying height is too high and hence the data cannot be properly written.

The above data storage device preferably further comprises: a variable gain amplifier for amplifying the read signal to a constant output power; wherein the flying height data generating section generates the flying height data based on a gain set for the variable gain amplifier. Thus, the flying height data is generated based on the gain, making it possible to efficiently determine whether the flying height is normal.

The above data storage device may be configured such that: the head sequentially outputs read signals each corresponding to one of a plurality of pieces of servo data read out from the medium; and the flying height data generating section generates the flying height data based on gains of the read signals each corresponding to one of the plurality of pieces of servo data. Therefore, flying height determination can be carried out at a required timing by using the servo data sequentially read out from the medium.

The evaluation value generating section may include an FIR filter which is set using the variable parameters. Use of such an FIR filter allows a suitable evaluation value to be obtained. Further, the variable parameters may include the number of taps of the FIR filter and a filter factor of each tap. This arrangement makes it possible to easily and effectively set the FIR filter. Further, the above data storage device is preferably configured such that: the head sequentially outputs read signals each corresponding to one of a plurality of pieces of servo data read out from the medium; the flying height data generating section sequentially generates the (plurality of) flying height data based on gains of the read signals each corresponding to one of the plurality of pieces of servo data; and the evaluation value generating section processes the flying height data by use of the FIR filter to generate the evaluation value, the flying height data being sequentially generated by the flying height data generating section.

The above data storage device preferably further comprises: a temperature detecting section for detecting a temperature; and a reference value generating section for generating a reference value corresponding to the temperature detected by the temperature detecting section; wherein the determining section determines whether the evaluation value is within a range specified by the reference value. Thus, the reference value corresponding to the temperature is generated, making it possible to accurately determine whether the flying height is normal even when the flying height changes with temperature.

According to another aspect of the present invention, a data storage device comprises: a medium for storing data; and a head for floating above the medium and moving so as to access a storage area of the medium; a data generating section for generating data corresponding to a flying height of the head; a temperature detecting section for detecting a temperature; a reference value generating section for generating a reference value based on the temperature detected by the temperature detecting section; and a determining section for, based on the generated data and the generated reference value, determining whether the flying height of the head is normal. Thus, the reference value corresponding to the temperature is generated, making it possible to accurately determine whether the flying height is normal even when the flying height changes with temperature.

The above data storage device preferably further comprises: a data write control section for inhibiting a data write operation to the medium depending on the determination by the flying height determining section. Further, the write control section preferably inhibits the data write operation to the medium if the flying height determining section has determined that the generated data is outside a range specified by the reference value. Thus, the data write operation is inhibited in the above case, making it possible to prevent occurrence of a write error when, for example, the flying height is too high and hence the data cannot be properly written.

The reference value generating section may process temperature data by use of a predetermined function to generate the reference value, the temperature data indicating the temperature detected by the temperature detecting section. This arrangement allows an appropriate reference value to be generated based on the temperature. Further, the function may be a linear function of the temperature data which decreases with decreasing temperature. This arrangement allows an appropriate reference value to be efficiently generated when the flying height increases with decreasing temperature.

The reference value generating section preferably generates the reference value so as to compensate for an increase in the flying height due to a decrease in the temperature. This arrangement makes it possible to properly determine whether the head flying height is normal when the flying height increases with decreasing temperature.

The above data storage device may further comprise: a variable gain amplifier for amplifying read signal to a constant output power, the read signal being read out from the medium by the head; wherein the data generating section generates the data based on a gain set for the variable gain amplifier. Thus, the flying height data is generated based on the gain, making it possible to efficiently determine whether the flying height is normal. Further, the above data storage device is preferably configured such that: the head sequentially outputs (a plurality of) read signals each corresponding to one of a plurality of pieces of servo data read out from the medium; and the data generating section generates the data based on gains of the read signals each corresponding to one of the plurality of pieces of servo data. Thus, the data is generated based on the plurality of gains, making it possible to more accurately determine whether the flying height is normal.

According to still another aspect of the present invention, there is provided a method for controlling a data storage device according to a flying height of a head which floats above a medium and moves so as to access a storage area of the medium, the method comprising: generating flying height data based on a read signal read out from the medium by the head, the flying height data indicating the flying height of the head; obtaining a plurality of pieces of generated flying height data and processing the plurality of pieces of flying height data based on preset variable parameters to generate an evaluation value; and based on the evaluation value and a predetermined reference value, determining whether the flying height is normal. Thus, the method generates the evaluation value by processing the plurality of pieces of flying height data based on the variable parameters, and determines whether the flying height is normal based on the evaluation value, making it easy to establish settings for each HDD. Further, the above method may further comprise inhibiting a data write operation to the medium depending on a determination result of the determining step. Thus, the data write operation is inhibited depending on the determination result, making it possible to prevent occurrence of a write error when, for example, the flying height is too high and hence the data cannot be properly written. It should be noted that the predetermined reference value may be stored in memory (beforehand) or it may be obtained by carrying out an operation on a given value, for example.

According to yet another aspect of the present invention, there is provided a method for controlling a data storage device, which determines whether a flying height of a head is normal, the head floating above a medium and moving so as to access a storage area of the medium, the method comprising: generating data corresponding to the flying height of the head; detecting a temperature; generating a reference value based on the detected temperature; and based on the generated data and the reference value, determining whether the flying height of the head is normal. Thus, the reference value is generated based on the temperature, making it possible to accurately determine whether the flying height is normal even when the flying height changes with temperature. Further, the above method preferably further comprises inhibiting a data write operation to the medium depending on a determination result of the determining step. Thus, the data write operation is inhibited depending on the determination result, making it possible to prevent occurrence of a write error when, for example, the flying height is too high and hence the data cannot be properly written.

The present invention makes it possible to properly determine whether a head flying height is normal.

BRIEF DESCRIPTION OF THE DRAWINGS

FIG. 13 is a diagram showing an exemplary configuration of a reference value table according to the second embodiment.

DETAILED DESCRIPTION OF THE INVENTION

Specific embodiments of the present invention will be described below. Although the present invention is described in connection with these embodiments, it should be understood that the present invention is not limited to such embodiments. For clarity of explanation, this specification simplifies the description and drawings of the present invention and makes omissions when appropriate. A person skilled in the art can easily make alterations, additions, and substitutions to each component of the following embodiments within the scope of the present invention. It should be noted that in the following figures, like numerals are used to denote like components, and repetitive description is avoided when appropriate for clarity of explanation.

First Embodiment

Figure 1:
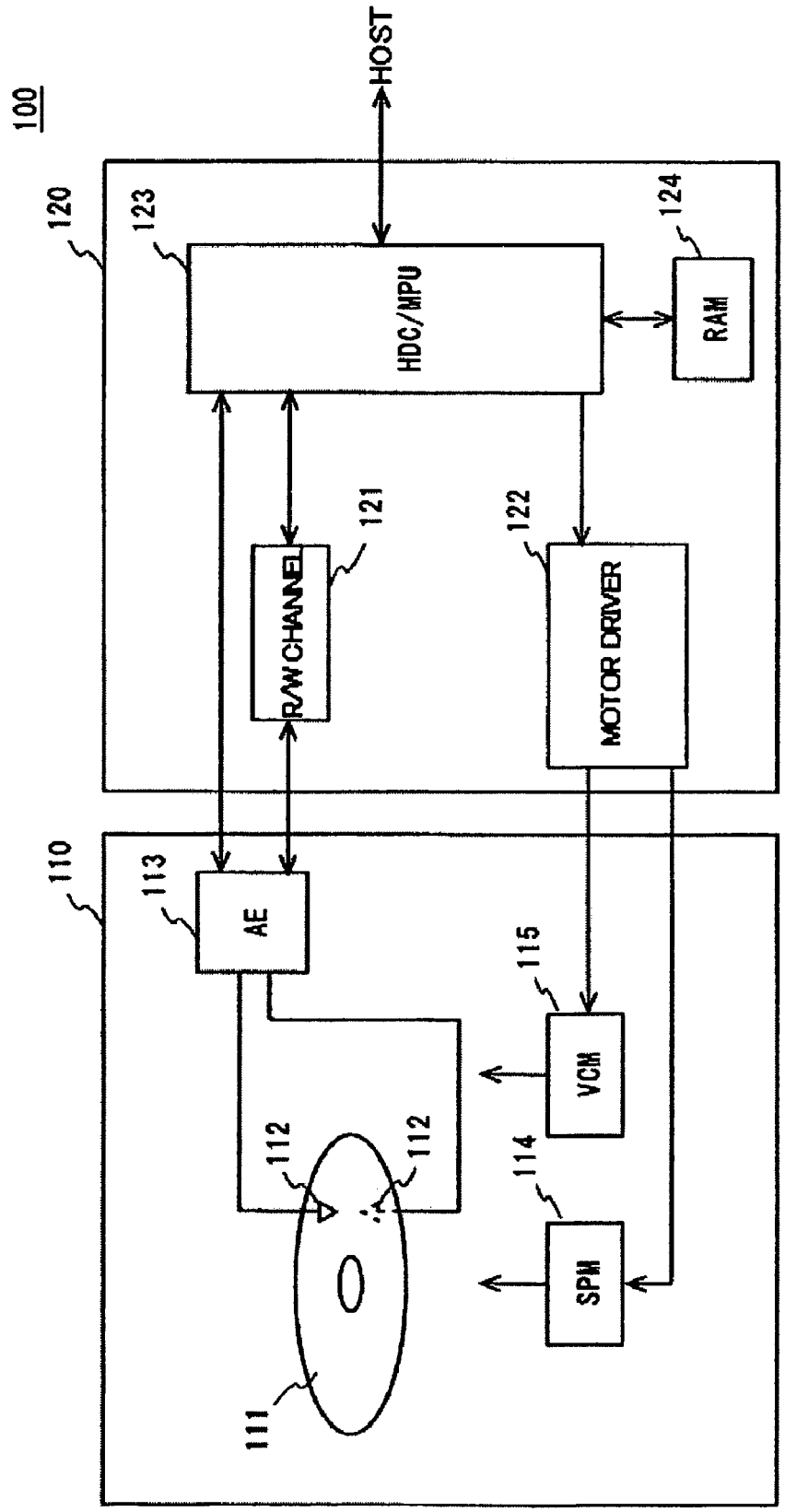
FIG. 1 is a block diagram schematically showing the configuration of a HDD according to a first embodiment of the present invention.

FIG. 1 schematically shows the configuration of a hard disk drive (HDD) 100 according to a first embodiment of the present invention. The HDD 100 comprises a magnetic disk 111 (a medium), two head device portions 112 (heads), arm electronics (AE) 113, a spindle motor (SPM) 114, and a voice coil motor (VCM) 115 all contained within a chassis 110. Furthermore, the HDD 100 comprises a circuit board 120 mounted on the outside of the chassis 110. The circuit board 120 has mounted thereon a read/write channel (R/W channel) 121, a motor driver unit 122, a hard disk controller/MPU integrated circuit 123 (hereinafter referred to as HDC/MPU 123), and RAM 124 (a memory or storage device).

The HDC/MPU 123 receives write data from the external host. The received write data is written to the magnetic disk 111 by the head device portions 112 through the R/W channel 121 and the AE 113. Data stored on the magnetic disk 111, on the other hand, is read out by the head device portions 112 and output from the HDC/MPU 123 to the external host through the AE 113 and the R/W channel 121.

Figure 2:
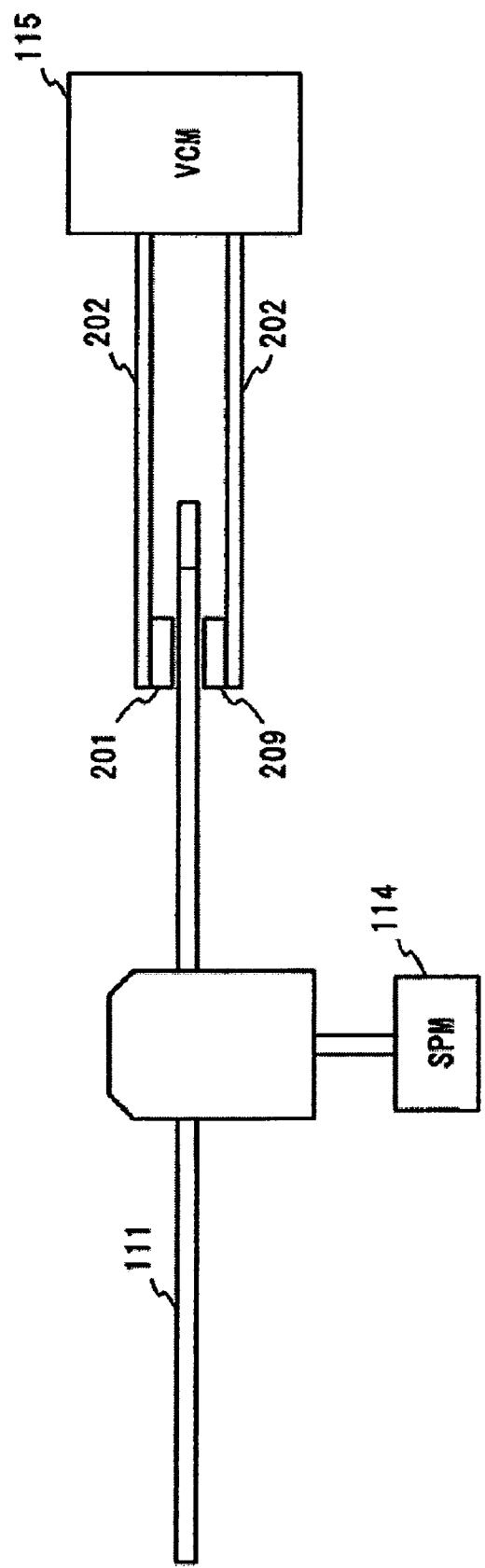
FIG. 2 is a diagram schematically showing the drive mechanisms for a magnetic disk and head device portions according to the first embodiment.

Each component of the HDD will be described below. First, brief description will be made of the drive mechanisms for the magnetic disk 111 and the head device portions 112 with reference to FIG. 2. The magnetic disk 111 is fixed to the rotational axis of the SPM 114. The motor driver unit 122 drives the SPM 114 such that the magnetic disk 111 rotates at a predetermined speed. The magnetic disk 111 has formed on both sides thereof recording surfaces on which data is stored, and the head device portions 112 (not shown) are each provided for one of the recording surfaces. Each head device portion 112 is fixed to a slider 201, which in turn is fixed to a carriage 202. The carriages 202 are fixed to the VCM 115, which swings so as to move the sliders 201 and the head device portions 112.

Each carriage 202 moves a head device portion 112 to a position above the data area on a surface of the magnetic disk 111 to write to or read from the magnetic disk 111. Specifically, the carriages 202 swing so as to move each head device portion 112 in a radial direction over a surface of the magnetic disk 111, enabling the head device portion 112 to access a desired area.

Each head device portion 112 is typically made up of a write head and a read head integrally formed with each other. The write head converts an electrical signal into a magnetic field according to the data to be written to the magnetic disk 111, while the read head converts a magnetic field generated from the magnetic disk 111 into an electrical signal. The pressure (to a head device portion) generated due to the viscosity of the air between the rotating magnetic disk 111 and the ABS (Air Bearing surface) surface of the slider 201 facing the magnetic disk 111 balances with the pressure applied (to the head device portion) by the carriage 202 toward the direction of the magnetic disk 111, causing the head device portion 112 to float above the magnetic disk 111 with a certain gap therebetween. Such a gap is referred to as a head flying height. It should be noted that the HDD 100 may comprise one or more magnetic disks 111, and a recording surface may be formed on one or both sides of each magnetic disk 111.

Referring back to FIG. 1, each circuit portion will be described. The AE 113 selects one of the plurality of head device portions 112 for data access, and pre-amplifies the reproduction signal reproduced by the selected head device portion 112 with a certain gain and outputs it to the R/W channel 121. Furthermore, the AE 113 receives a write signal from the R/W channel 121 and outputs it to a selected head device portion 112.

The R/W channel 121 performs write processing on the data obtained from the host. Specifically, in the write processing, the R/W channel 121 code-modulates the write data supplied from the HDC/MPU 123 and then converts the code-modulated write data into a write signal (an electric current) before supplying it to the AE 113. The R/W channel 121 also performs read processing when supplying data to the host.

In the read processing, the R/W channel 121 amplifies the read signal supplied from the AE 113 to a given amplitude, extracts data from the amplified read signal, and performs decode processing on the data. The extracted data includes user data and servo data. The decoded read data is supplied to the HDC/MPU 123. According to the present embodiment, the gain with which the read signal is amplified by the R/W channel 121 is used to control the write processing, as described later in detail.

The HDC/MPU 123 is a circuit made up of an MPU and a HDC integrated on a single chip. The MPU operates according to microcode loaded into the RAM 124 and controls the entire hard disk drive 100, such as positioning control of each head device portion 112, interface control, and defect management, as well as performing the processing necessary for data processing. At startup of the hard disk drive 100, the microcode to be executed on the MPU and the data necessary for the control and data processing are loaded into the RAM 124 from the magnetic disk 111 or ROM (not shown).

The HDC/MPU 123 is provided with an interface capability to the host and receives the user data and the read and write commands sent from the host. The received user data is transferred to the R/W channel 121. The HDC/MPU 123 also receives the data read out from the magnetic disk through the R/W channel 121 and transmits it to the host. Furthermore, the HDC/MPU 123 performs error correction (ECC) processing on the user data obtained from the host or read out from the magnetic disk 111.

The data read out by the R/W channel 121 includes servo data as well as user data. The HDC/MPU 123 controls positioning of each head device portion 112 by use of the servo data. The HDC/MPU 123 outputs control data to the motor driver unit 122. The motor driver unit 122 supplies a drive current to the VCM 115 according to the control signal. Furthermore, the HDC/MPU 123 controls the data read/write processing based on the servo data. Particularly according to the present embodiment, in the write processing, the HDC/MPU 123 controls whether to permit or inhibit a data write operation to the magnetic disk 111 based on the value of the signal amplifier gain obtained from the R/W channel 121, as described later.

Figure 3:
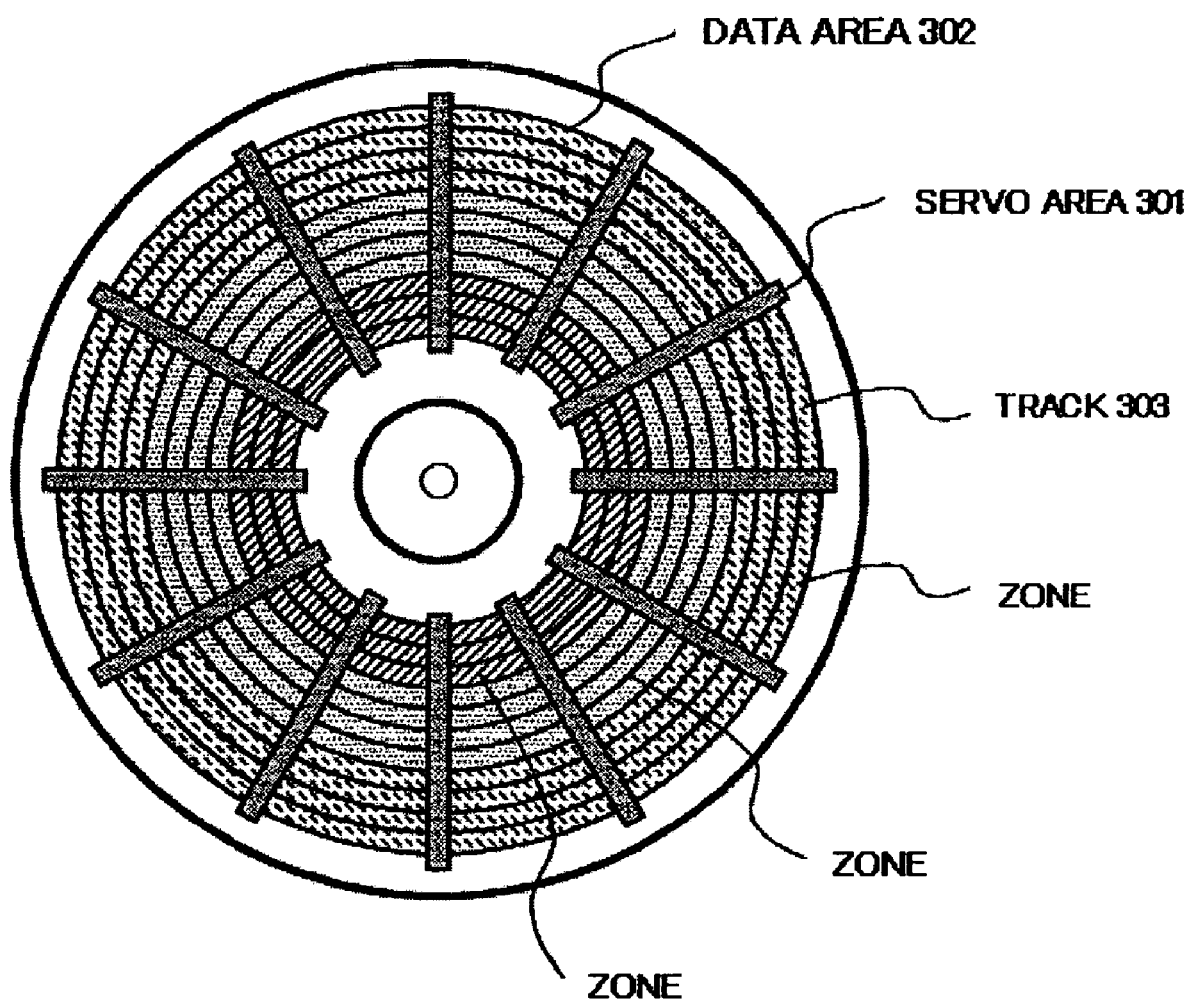
FIG. 3 is a diagram schematically showing the arrangement of the data stored on a recording surface of a magnetic disk according to the first embodiment.

Description will be made of the data stored on the magnetic disk 111 with reference to FIG. 3. FIG. 3 schematically shows the arrangement of the data stored on a recording surface of the magnetic disk 111. As shown in FIG. 3, on the recording surface of the magnetic disk 111 are formed a plurality of servo areas 301 and a plurality of data areas 302 each disposed between two neighboring servo areas 301. The plurality of servo areas 301 each extend from the center of the magnetic disk 111 in a radial direction at a predetermined angle. Thus, the servo areas 301 and the data areas 302 are alternately disposed at a predetermined angle relative to one another. Each servo area 301 stores servo data for controlling positioning of the head device portion 112, while each data area 302 stores user data.

Also on the recording surface of the magnetic disk 111 are formed a plurality of concentric tracks 303 with a predetermined width in a radial direction. The servo data and the user data are stored along the tracks 303. Each track segment (303) between servo areas 301 includes a plurality of data sectors (in which user data is stored as a unit). The tracks 303 are grouped into a plurality of zones according to their radial position on the magnetic disk 111. The number of sectors 304 in each track 303 varies depending on the zone to which it belongs. The example in FIG. 3 employs three zones. The recording frequency may be changed for each zone so as to increase the recording density.

Figure 4:
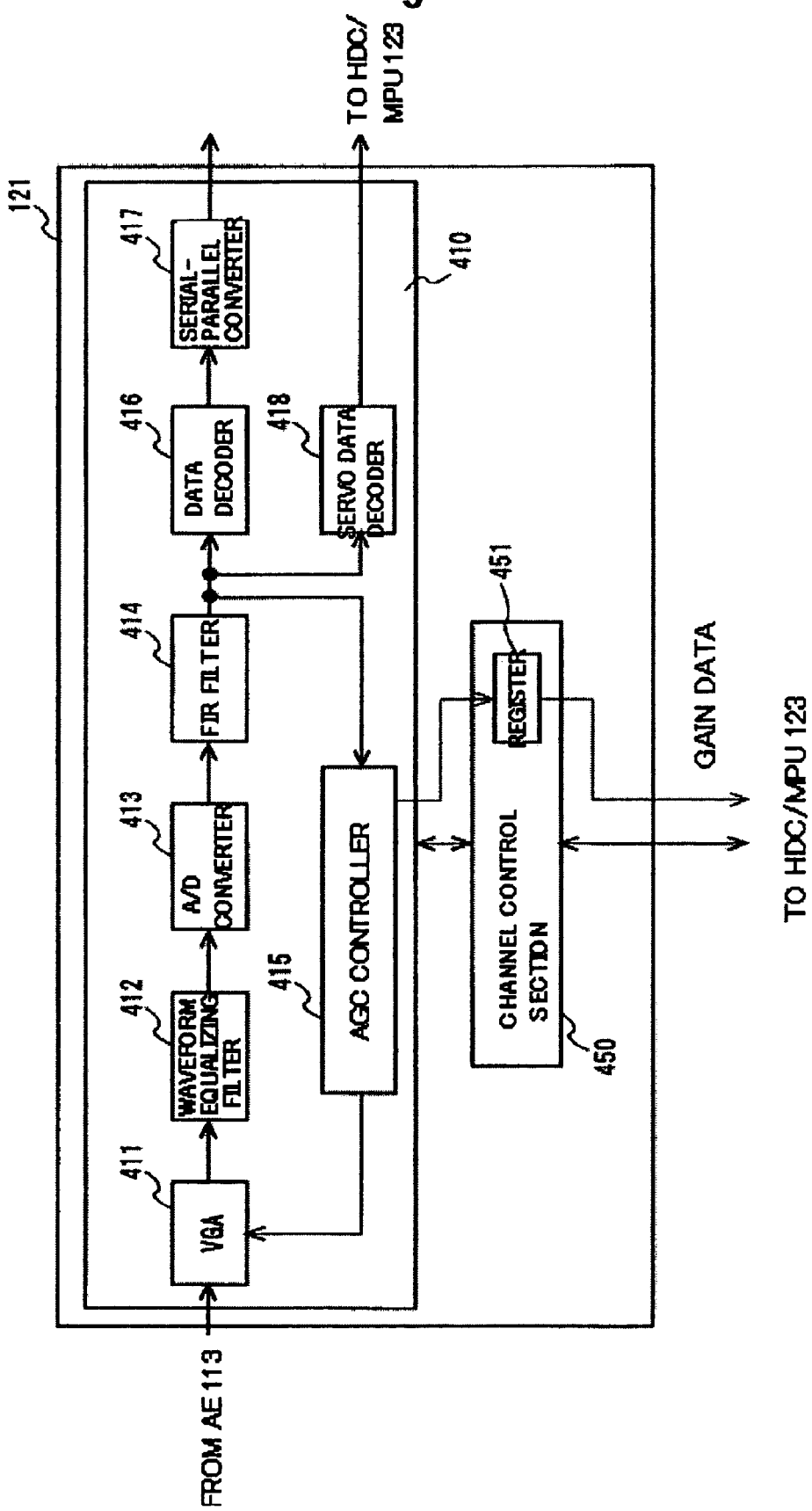
FIG. 4 is a block diagram showing the logical configuration of a R/W channel currently performing read processing according to the first embodiment.

Description will be made below of the read processing performed by the R/W channel 121. FIG. 4 is a block diagram showing the logical configuration of the R/W channel 121 currently performing the read processing according to the present embodiment. As shown in FIG. 4, the R/W channel 121 includes: a read processing section 410 for performing data read processing from the magnetic disk; and a channel control section 450 for controlling the data read processing performed by the read processing section 410. The channel control section 450 can set parameters for the read processing section 410 so as to control the read processing. The channel control section 450 includes a register 451 for storing the parameters obtained from the read processing section 410. According to the present embodiment, the register 451 stores the gain data obtained from an AGC (Automatic Gain Control) controller 415.

Description will be made of the read processing in which data is read out from the magnetic disk 111. As shown in FIG. 4, the read processing section 410 includes a VGA (Variable Gain Amp) 411, a waveform equalizing filter 412, an A/D converter 413, an FIR (Finite Impulse Response) filter 414, the AGC controller 415, a data decoder 416, a serial-parallel converter 417, and a servo data decoder 418. The AGC controller 415 is a flying height data generating section (flying height data generating section or data generating section for generating data corresponding to the head flying height).

The VGA 411 changes its gain so as to keep the output constant under control of the AGC controller 415. The waveform equalizing filter 412 performs waveform equalization processing on the input analog signal. The A/D converter 413 samples and quantizes the analog signal. The FIR filter 414, which is a transversal filter, performs transversal equalization processing on the digital signal. The AGC controller 415 controls the VGA 411 so as to keep the input voltage constant. The data decoder 416 performs decode processing and demodulation processing on the input data. The serial-parallel converter 417 converts input serial data into parallel data. The servo data decoder 418 decodes the servo address of the servo signal and outputs it to the HDC/MPU 123.

The read signal reproduced by each head device portion 112 is input to the VGA 411 after it is pre-amplified by the AE 113 with a given gain. The VGA 411 amplifies the input signal to a signal level processable by the HDC/MPU 123. When the reproduced signal is for user data, the AGC controller 415 tracks changes in the signal level of the reproduced signal and automatically adjusts the gain through feedback control using digital processing so as to keep the amplitude of the amplified reproduced signal within a given range. When the reproduced signal is for servo data, the AGC controller 415 determines the gain based on the head portion of the servo signal and then amplifies the subsequent portions of the servo signal with the determined constant gain.

The waveform equalizing filter 412 has the function of a low-pass filter. For the subsequent signal processing, the waveform equalizing filter 412 removes noise from the input signal and performs waveform equalization processing for slimming the waveform. The output from the waveform equalizing filter 412 is converted into a digital signal through sampling and quantization by the A/D converter 413 and input to the FIR filter 414.

To accurately restore the data, the FIR filter 414 shapes the input waveform so as to equalize it to a desired waveform. The output signal from the FIR filter 414 is input to the data decoder 416. The data decoder 416 processes the waveform equalized by the FIR filter by use of a PRML (Partial Response Maximum Likelihood) processing circuit to produce an RLL (Run Length Limited) signal. The data decoder 416 then determines the most likely data sequence based on the relationships between each piece of data according to a predetermined algorithm. Then, the data decoder 416 demodulates the coded RLL signal into the original signal. The serial data demodulated by the data decoder 416 is converted into parallel data by the serial-parallel converter 417, and input to the HDC/MPU 123. In the case of servo data, the servo data decoder 418 decodes the servo address of the servo signal whose waveform has been shaped by the FIR filter 414, and outputs it to the HDC/MPU 123.

Figure 5:
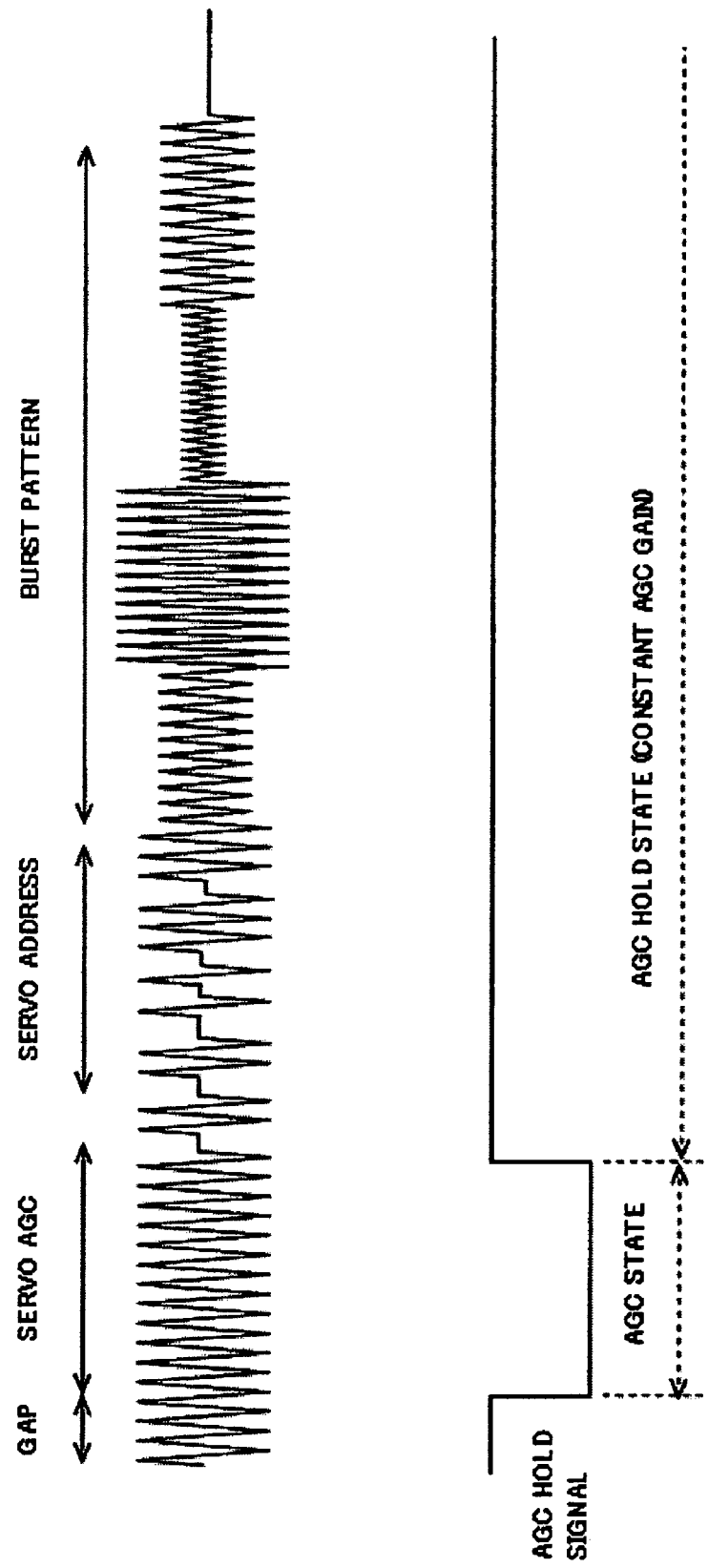
FIG. 5 is a diagram showing a servo signal according to the first embodiment.

Description will be made below of the servo signal stored on the magnetic disk 111. As shown in FIG. 5, the servo signal (the servo data reproduction signal) includes a gap, servo AGC, a servo address, and a burst pattern. The gap is used to accommodate timing deviation due to a change in the rotation, etc. The servo AGC is used to determine the AGC gain of the servo signal. The servo address includes positional information such as a cylinder ID, a servo sector number, etc. The burst pattern is obtained as a result of converting changes in the amplitude of the reproduction signal into numbers and used for tracking control (track following) by the head device portion 112.

When the servo AGC is reproduced, the AGC HOLD signal falls to the L (low) level and the AGC controller 415 adjusts the gain. The AGC HOLD signal then rises to the H (high) level at a predetermined timing, and the AGC controller 415 determines a value for the gain of the servo signal and maintain the gain at that value (assumes the AGC HOLD state). The servo address and the burst pattern are amplified by the VGA 411 with the determined gain. The channel controller 450 obtains gain data indicating the determined gain from the AGC controller 415 and stores it in the register 451.

As described above, each head device portion 112 floats above the magnetic disk 111 with a gap therebetween. However, if a head device portion 112 floats abnormally high, the data cannot be properly written to the magnetic disk 111, or no data can be written to the magnetic disk 111 at all. This means that the previous data is left intact on the magnetic disk 111. According to the present embodiment, if it is determined that the flying height of a head device portion 112 is abnormal, the HDD 100 inhibits data write operation to the magnetic disk 111. This arrangement prevents erroneous data from being written, as well as preventing the situation where a notification indicating proper completion of a data write operation is issued to the host even though the previous data is left on the magnetic disk 111.

As the flying height of the head device portion 112 increases, the level of the signal reproduced by the head device portion 112 decreases. The AGC controller 415 tracks changes in the signal level of the reproduced signal and automatically adjusts the gain through feedback control using digital processing, as described above. When the reproduction level of a head device portion 112 is low, the gain is increased, and when the reproduction level is high, on the other hand, the gain is decreased. Therefore, the gain set by the AGC controller 415 may be monitored to obtain information about the flying height of the head device portion 112.

The HDD 100 of the present embodiment detects an abnormality in the head flying height based on the AGC gain in the servo data read operation and thereby prevents erroneous data from being written. The HDD 100 uses a reference value determined at the design or manufacturing stage to determine whether the flying height of a head device portion 112 is abnormal. An abnormal AGC gain value and hence an abnormality in the head flying height can be detected by comparing the reference value and the AGC gain.

Further, the HDD 100 of the present embodiment does not compare the AGC gain value obtained from each servo sector with a reference value separately, but uses a value obtained as a result of processing a plurality of pieces of servo data by use of an evaluation function, instead. Specifically, the present embodiment preferably uses a filter function to multiply the AGC gain value of each of the plurality of servo sectors by a weighting factor and add the results together to produce a reference value for detecting an abnormality in the flying height. This arrangement can prevent occurrence of overkill (in which a write operation is inhibited when data should be written) when one AGC gain value has erroneously increased due to the quality of the servo pattern regardless of the flying height, for example.

According to the present embodiment, parameters of the evaluation function can be set and changed. Specifically, the weighting factor by which each AGC gain value is multiplied or the number of AGC gain values (the number of pieces of servo data) to be used is stored in memory and set as a variable parameter. These parameters may be set as programmable parameters so that they can be easily changed, making it possible to efficiently design the evaluation function for each HDD.

Figure 6:
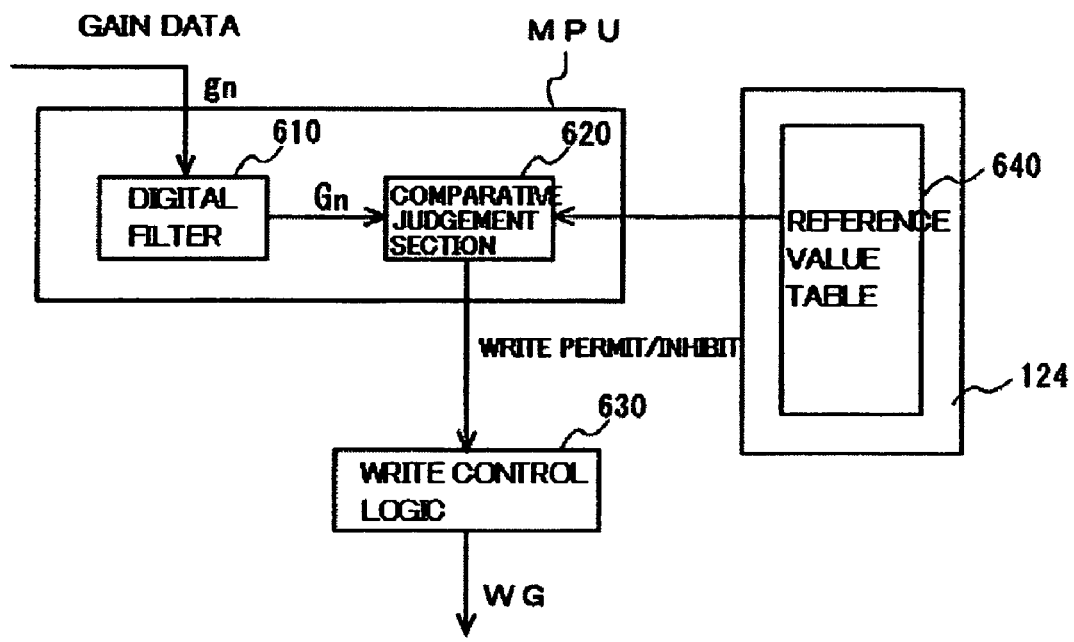
FIG. 6 is a diagram showing a logical configuration for monitoring AGC gain (head flying height) and controlling data write processing according to the first embodiment.

Description will be made below of how to determine whether the flying height of a head device portion 112 is abnormal and of the data write inhibit processing performed after the flying height is determined to be abnormal with reference to FIGS. 6 to 9. FIG. 6 shows a logical configuration for monitoring the AGC gain (head flying height) and controlling the data write processing. The write processing control according to the head flying height is mainly performed within the HDC/MPU 123. Referring to FIG. 6, reference numeral 610 denotes a digital filter (a specific example for providing the evaluation function). The digital filter 610 corresponds to an evaluation value generating section (evaluation value generating module) and a data generating section (data generating module) for generating data corresponding to the head flying height. Reference numeral 620 denotes a comparative judgment section (comparative judgment module) for determining occurrence of an abnormality in the flying height based on the gain data set for the VGA and a reference value registered in a reference value table 640 beforehand. Specifically, the comparative judgment section 620 determines whether the gain data is within a range indicated by the reference value.

Reference numeral 630 denotes write control logic for controlling whether to permit or inhibit data write operation to the magnetic disk 111. The write control logic 630 outputs to each section a write gate (WG) signal for controlling the write timing. A data write operation to the magnetic disk 111 can be inhibited by masking the WG signal. The WG signal is masked to inhibit data write operation in the event of an abnormality in the flying height, a positional error, etc. Reference numeral 640 denotes the reference value table stored in RAM 124. The MPU which operates according to microcode can function as the digital filter 610 and the comparative judgment section 620. The write control logic 630 may be implemented as circuit logic within the HDC/MPU 123.

Figure 7:
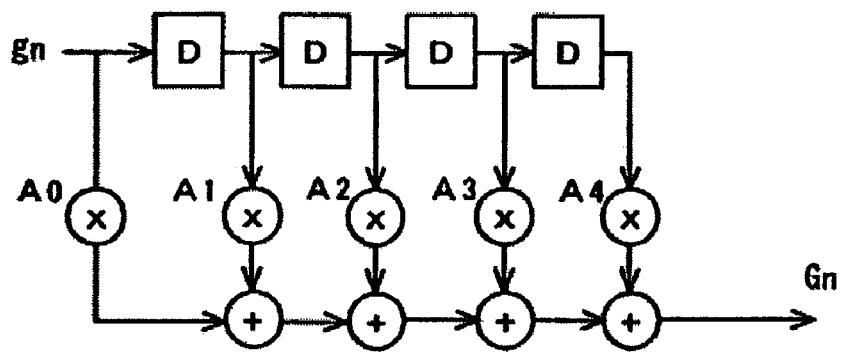
FIG. 7 is a diagram showing the configuration of a digital filter according to the first embodiment.

The digital filter 610 performs filtering processing on the gain data obtained from the channel control section 450 of the R/W channel 121. FIG. 7 shows an exemplary configuration of the digital filter 610. An FIR filter is preferably used as the digital filter 610. Specifically, FIG. 7 shows a four-dimensional FIR filter having a filter length of 5 (the number of taps is 5). The filter length (the number of taps) is set to an appropriate value for each design.

Referring to FIG. 7, symbol D denotes delay operation processing (a delay element) for delaying data by one clock. Each filter factor $A_{n-i}$ corresponds to the variable weighting factor for a piece of gain data. As indicated by the equation in FIG. 7, the output G of the digital filter 610 equals the sum of the gain data $g_i$ of each of the current and previous servo sectors multiplied by a respective weighting factor $A_{n-i}$. Each weighting factor $A_{n-i}$ may be positive or negative and is set as a programmable parameter at the design or manufacturing stage. The filter length of the digital filter 610 is also set as a variable programmable parameter. For example, it may be arranged that the output of the digital filter 610 is an average of a plurality of pieces of gain data or it is the difference between the gain data of the current servo sector and that of the immediately previous servo sector.

The reference values for the AGC gain are registered in the reference value table 640 stored in RAM 124. The reference values may be set based on measured value data of the gain of the AGC controller 415 obtained when the head flying height is normal, beforehand. Specifically, each reference value for detecting an abnormality in the head flying height is obtained by adding an appropriate margin value to a measured value of the AGC gain when the head flying height is normal. For example, each reference value may be set such that it is 1.1 times a measured value.

Figure 8:
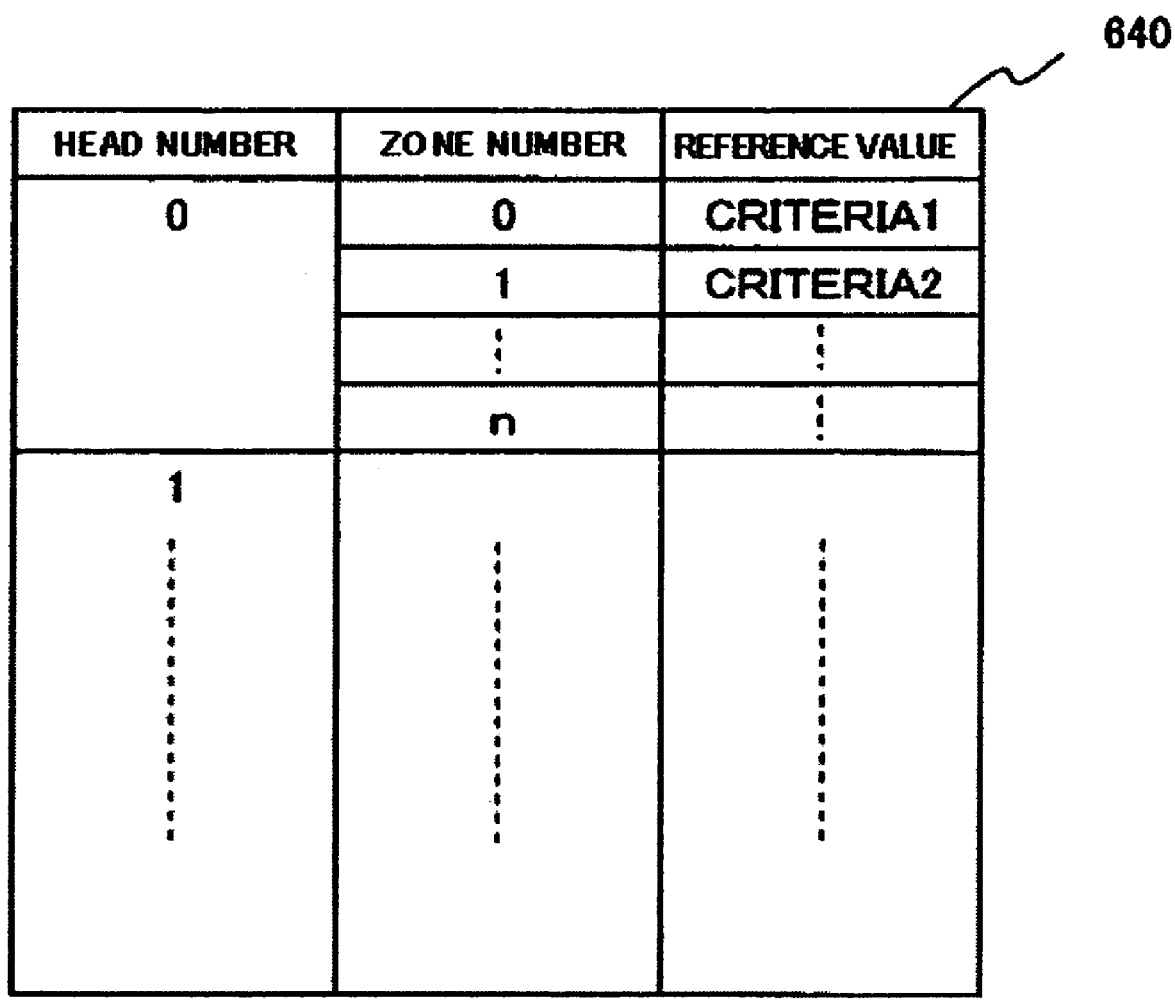
FIG. 8 is a diagram showing an exemplary configuration of a reference value table according to the first embodiment.

FIG. 8 shows an exemplary configuration of the reference value table 640. A reference value(s) CRITERIA is preferably set for each head device portion 112 separately, as shown in FIG. 8. This arrangement makes it possible to set the most appropriate reference value(s) for each head device portion 112. Furthermore, it is preferable to set the most appropriate reference value for each zone considering the fact that the flying height of each head device portion 112 may change depending on its radial position on the magnetic disk 111. It should be noted that a measured value table may be stored instead of the reference value table, and each reference value may be calculated as necessary.

Description will be made below of how to determine whether a head flying height is normal or abnormal and of the write operation control after the determination. In response to a data write command from the host, a head device portion 112 seeks a target track while reading servo data on the magnetic disk 111. When the head device portion 112 has reached the target track, positioning control (tack following) is carried out over the target track using the burst pattern.

Figure 9:
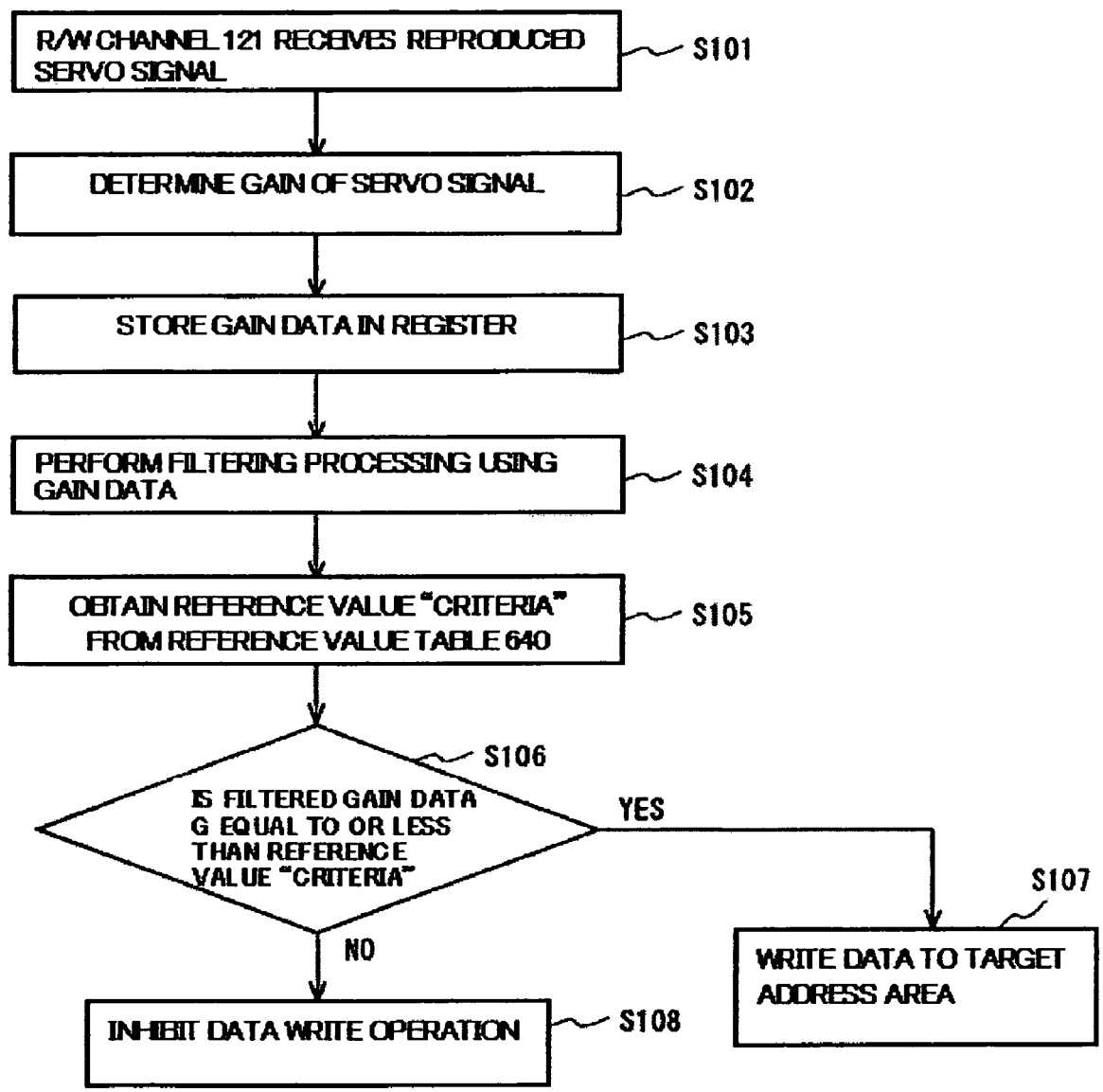
FIG. 9 is a flowchart for determining whether a head flying height is normal and performing write processing based on the determination according to the first embodiment.

The operation is described below with reference to the flowchart of FIG. 9. The servo signal reproduced by the head device portion 112 through a seek operation or track following is input to the R/W channel 121 via the AE 113 at step S101. The AGC controller 415 adjusts the gain of the reproduced signal based on the servo AGC of the servo signal (determines the gain of the servo signal) at step S 102.

Gain data indicating the determined gain is stored in the register 451 of the channel control section 450 at step S103.

The gain data g is input to the HDC/MPU 123 from the register. The digital filter 610 performs filtering processing using the obtained gain data g and the gain data of previous sectors at step S104. The comparative judgment section 620 obtains the reference value CRITERIA for the present head and zone from the reference value table 640 at step S105. The comparative judgment section 620 also obtains the filtered gain data G from the digital filter 610, and compares the gain data G and the reference value CRITERIA to determine whether the flying height is normal or abnormal at step 106.

If it is determined at step S106 that the gain data G is equal to or less than the reference value CRITERIA, the comparative judgment section 620 determines that the head flying height (the gain data G) is normal. The comparative judgment section 620 outputs a write permit signal to the write control logic 630. The flying height monitoring processing using the gain data G is repeated until a target address is reached. Then, data is written to the target address area at step S107.

If, on the other hand, it is determined at step S106 that the gain G is larger than the reference value CRITERIA, the comparative judgment section 620 determines that the head flying height (the gain data G) is abnormal, and data write operation to the magnetic disk 111 is inhibited at S108. Specifically, the comparative judgment section 620 outputs a write inhibit signal to the write control logic 630. Receiving the write inhibit signal, the write control logic 630 masks the write gate signal (WG signal), stopping the write operation. It should be noted that after stopping the write operation, ERP (Error Recovery Procedure) processing may be carried out, such as repeating loading/unloading operation of the head device portion 112 or shaking the head device portion 112.

It should be noted that the relation between each component and the processing that it performs may be changed; that is, a specific processing operation may be performed by a component different from that described above. For example, part of the function of the R/W channel 121 may be performed by the HDC/MPU 123. Further, each processing function of the present invention may be implemented by hardware or software depending on the design. The chip in which each function is implemented may also be determined depending on the design. Further, the HDD may be controlled by detecting whether the flying height is low, instead of detecting whether it is high. The present invention is advantageous when applied to information storage apparatuses using a magnetic disk. However, the present invention can be applied to information storage apparatuses using a light beam, etc. Further, the technique of the present invention for monitoring the head flying height may be applied to HDD control other than data write inhibit control. These alternative arrangements also apply to the following embodiments.

Second Embodiment

The HDD of a second embodiment of the present invention differs from that (HDD 100) of the first embodiment in the way in which each reference value CRITERIA is generated and processed. The other arrangements are substantially the same as those of the HDD 100 of the first embodiment. Therefore, the HDD of the present embodiment will be described by focusing on the above different features.

Figure 10:
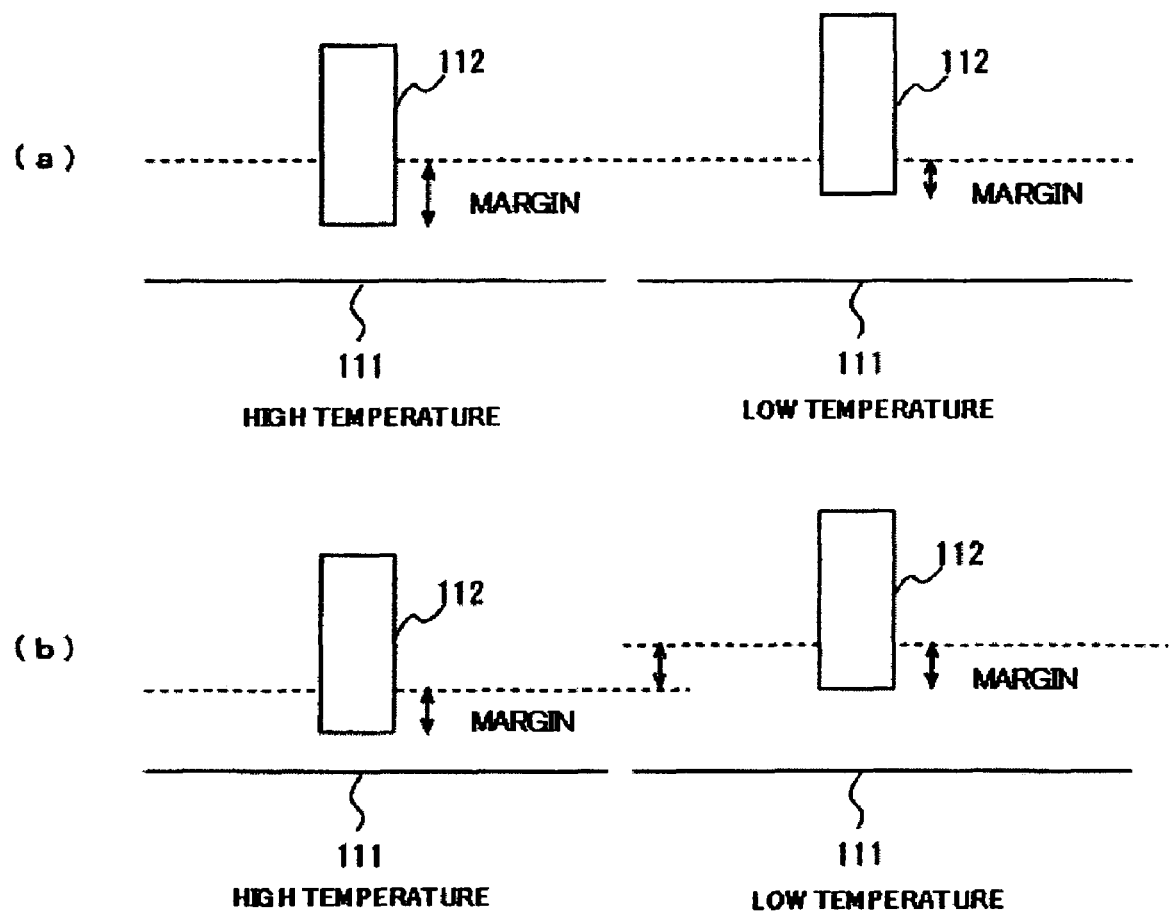
FIG. 10 includes FIGS. 10(a) and 10(b) which are diagrams illustrating how a head flying height changes with temperature according to a second embodiment of the present invention.

FIG. 10 (including FIGS. 10(a) and 10(b)) shows changes in a head flying height due to temperature changes and the relationship between the head flying height and a reference height which is used to determine whether the flying height is abnormal. For example, the head flying height is determined to be abnormal if the undersurface of the head device portion 112 rises above the reference height. The flying height of the head device portion 112 (the flying height of the slider) changes with temperature. The flying height of the head device portion 112 increases with decreasing temperature, as shown in FIG. 10(a). The height difference between the undersurface of the head device portion 112 and the reference height (that is, the height margin for determining that the flying height of the head device portion 112 is normal) is small at low temperatures if the reference height is set to a constant value.

On the other hand, the height difference between the undersurface of the head device portion 112 and the reference height (that is, the height margin for determining that the flying height of the head device portion 112 is normal) is large at high temperatures. Reliably detecting an abnormality in the flying height requires reducing the height difference between the undersurface of the head device portion 112 and the reference height (that is, the height margin for determining that the flying height of the head device portion 112 is normal). However, if the height margin is set to an appropriate value at low temperatures, the margin becomes too large at high temperatures, which might prevent proper detection of an abnormality in the flying height. On the other hand, if the height margin is set to an appropriate value at high temperatures, the margin becomes too small at low temperatures. As a result, the flying height might be erroneously determined to be abnormal when it is normal.

The HDD of the present embodiment uses different reference values CRITERIA for the gain data at different temperatures. That is, the reference height is varied depending on the temperature, as shown in FIG. 10(b). The reference value CRITERIA is set such that it is larger at low temperatures than at high temperatures. This means that the reference height is smaller at high temperatures than at low temperatures. This makes it possible to set the height difference between the undersurface of the head device portion 112 and the reference height (that is, the height margin for determining that the flying height of the head device 112 is normal) to an appropriate value by considering the changes in the flying height due to temperature changes. As a result, it is possible to properly detect an abnormality in the flying height regardless of temperature.

Figure 11:
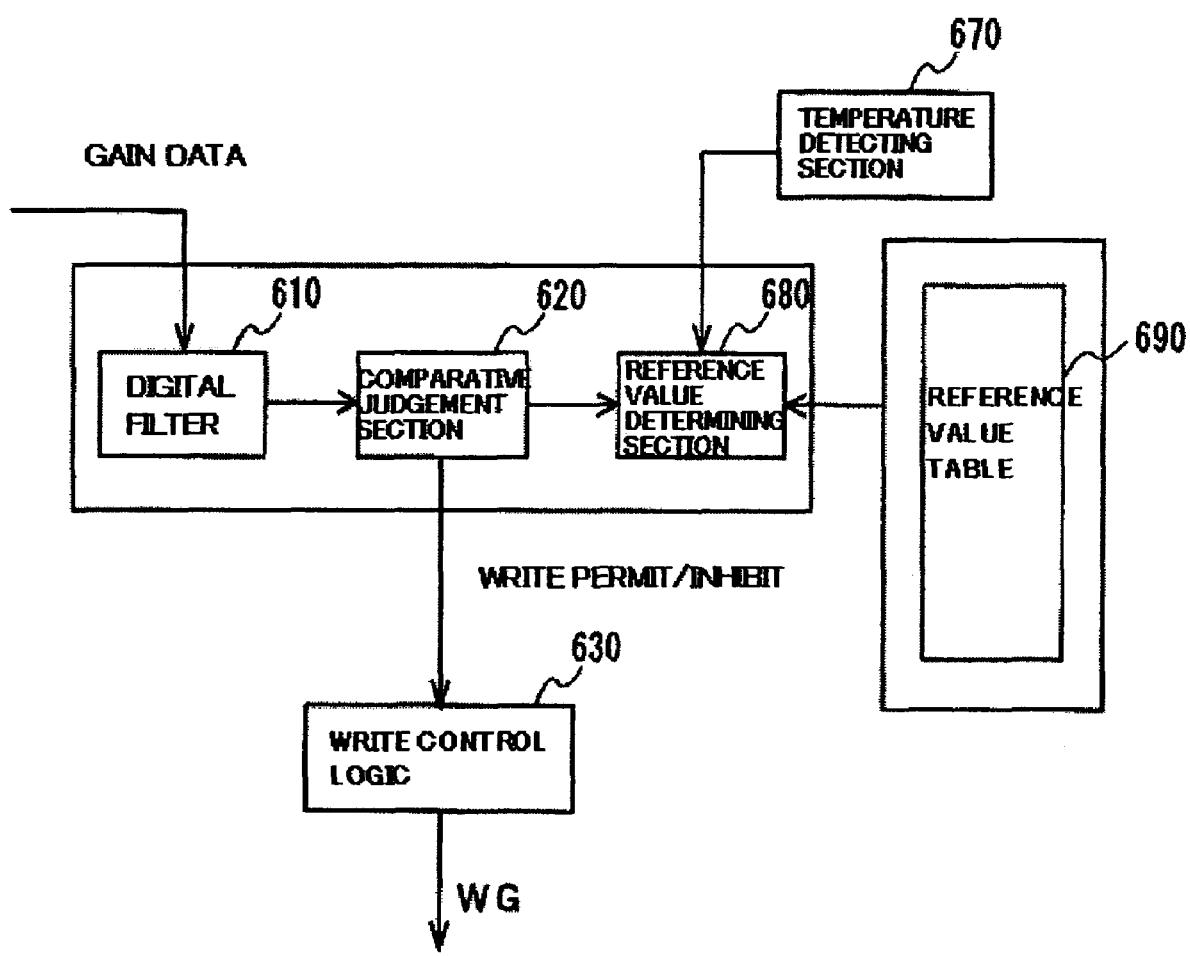
FIG. 11 is a block diagram showing a logical configuration for monitoring AGC gain (head flying height) and controlling data write processing according to the second embodiment.

FIG. 11 shows a logical configuration for the HDD of the present embodiment for monitoring the AGC gain (the head flying height) and thereby controlling the data write processing. Referring to FIG. 11, since a digital filter 610, a comparative judgment section 620, and write control logic 630 are the same as the corresponding components of the first embodiment, their detailed description will be omitted. Reference numeral 670 denotes a temperature detecting section (temperature detecting module) made up of a resistance thermometer or the like. The temperature detected by the temperature detecting section is A/D converted and used by a reference value determining section 680 (reference value generating module) of the MPU for processing. The MPU operates according to microcode so as to function as the reference value determining section 680. The reference value determining section 680 checks a reference value table 690 and determines a reference value CRITERIA corresponding to the temperature data obtained from the temperature detecting section 670.

The reference value determining section 680 determines a reference value CRITERIA for each temperature by use of a predetermined equation. This arrangement allows a more appropriate reference value CRITERIA to be determined for each temperature value since the detected temperature continuously changes. One exemplary equation is: CRITERIA for detected temperature=CRITERIA for first reference temperature+k×(detected temperature−first reference temperature). The CRITERIA (reference value) for the first reference temperature can be determined by measuring an actual flying height (AGC gain) at the manufacturing stage. The symbol k is a real number and can be determined based on the relation between the temperature and the flying height (AGC gain) obtained as a result of measuring the flying height (AGC gain) at a plurality of temperatures. To calculate an appropriate value for k, the more points of measurement, the better. From the viewpoint of manufacturing efficiency, however, the less points of measurement, the better. Therefore, 2 points of measurement are preferably set.

For example, if the CRITERIA (reference value) for each temperature is determined based on those for two reference temperatures, k is expressed as the following equation: k=(CRITERIA for first reference temperature−CRITERIA for second reference temperature)/(first reference temperature−second reference temperature).

Figure 12:
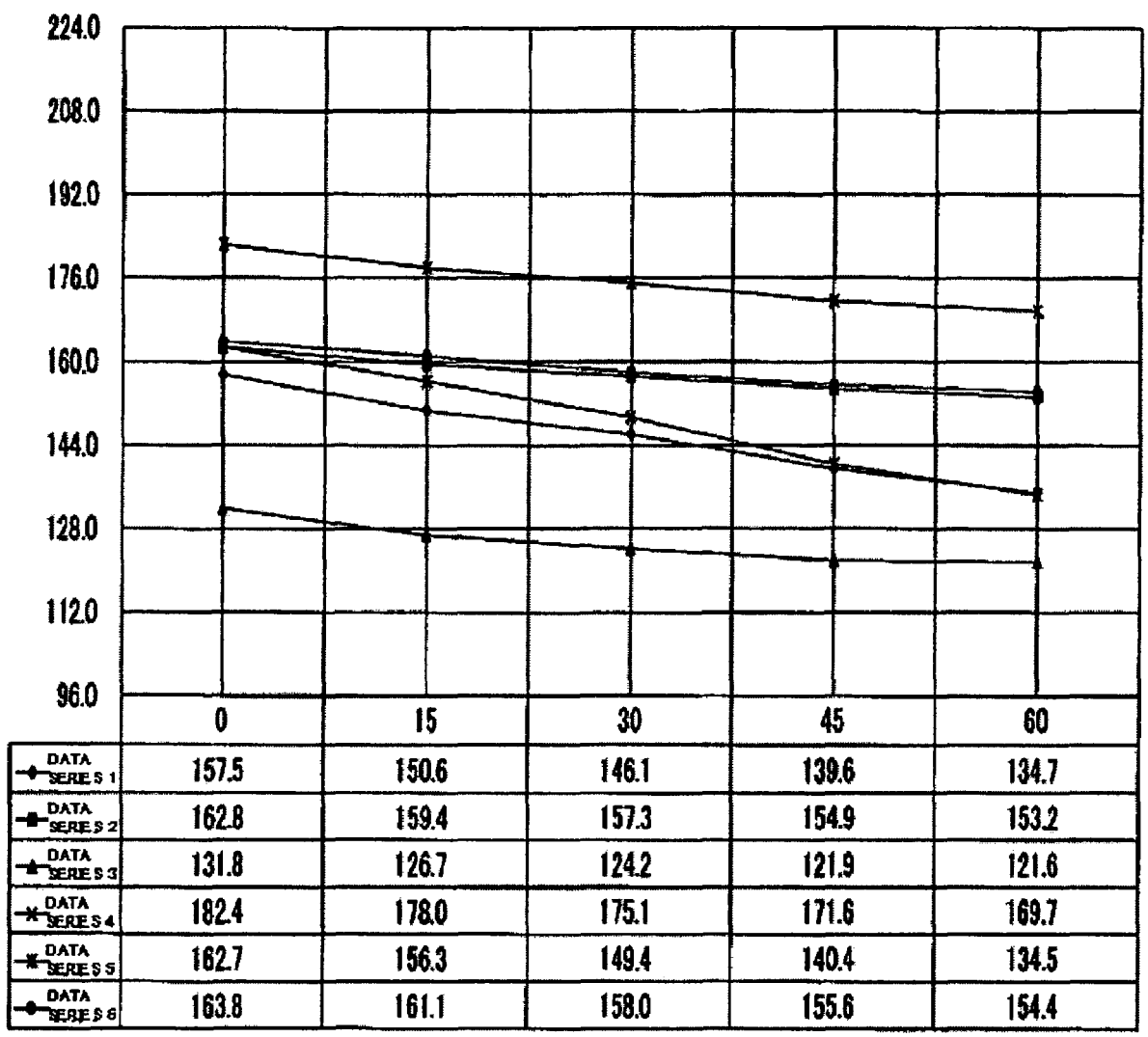
FIG. 12 shows measurement data indicating relationships between temperature and ordinary AGC gain.

FIG. 12 is measurement data indicating relationships between the temperature and the ordinary AGC gain. The y-axis indicates the AGC gain, while the x-axis indicates the temperature (in degrees Celsius). Measurements were made on a total of 3 products (HDDs) each including two heads (indicated by reference numerals 0HD and 1HD). FIG. 12 shows the relationship between the temperature and the AGC gain for each head. As shown in the figure, the temperature and the AGC gain have a substantially linear relationship; each relationship between the temperature and the AGC gain can be approximated by a linear function.

Therefore, for example, the AGC gain at each temperature can be estimated based on measurements of the AGC gain at two different temperatures. If the AGC gain is measured at three different temperatures, the parameter(s) of the function can be determined by a least-squares method, for example. An appropriate margin may be added to the obtained AGC gain at each temperature to produce the reference value CRITERIA used for determining whether the flying height is abnormal at each temperature.

FIG. 13 shows an exemplary configuration of the reference value table 690 of the present embodiment. The reference value table 690 stores a set of parameters, denoted by P, used to determine a reference value for each zone for each head. According to the above exemplary arrangement, the table stores, for each zone for each head, the first reference temperature, the CRITERIA (reference value) for the first reference temperature, and the real number k as a set of parameters P.

Figure 14:
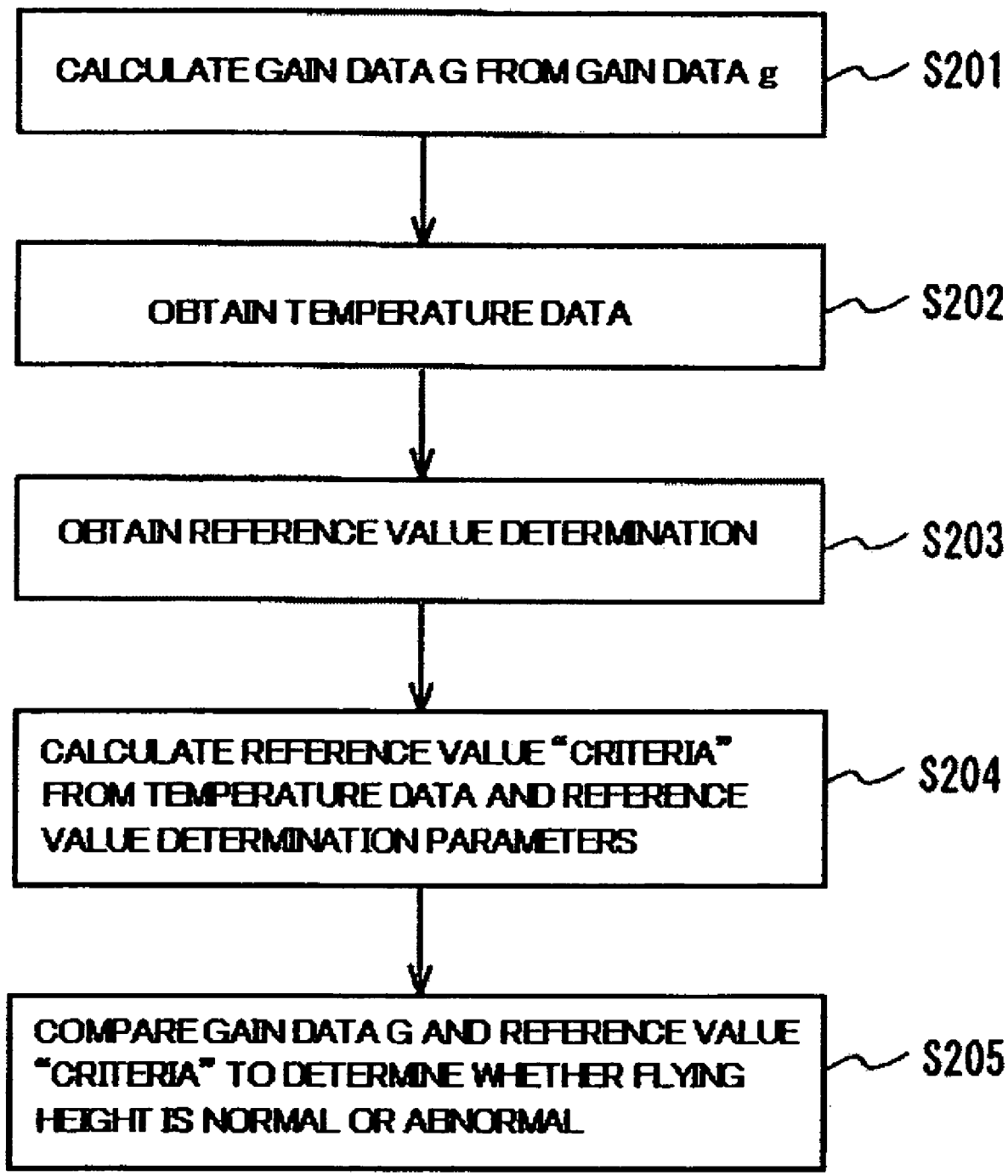
FIG. 14 is a flowchart for monitoring AGC gain (head flying height) and controlling data write processing according to the second embodiment.

The processing performed in the logical configuration shown in FIG. 11 will be described with reference to the flowchart of FIG. 14. When the data write processing begins, the digital filter 610 receives gain data g from the AGC controller 415. The digital filter 610 performs filtering processing on the gain data g to produce gain data G at step S201. The gain data G is supplied to the comparative judgment section 620. At step S202, the reference value determining section 680 obtains temperature data indicating the temperature detected by the temperature detecting section 670. Furthermore, the reference value determining section 680 obtains the reference value determination parameters for the target zone for the head of interest from the reference value table 690 at step S203.

The reference value determining section 680 performs an operation on the obtained temperature data and reference value determination parameters to produce the reference value CRITERIA for the current temperature at step S204. The reference value determining section 680 then supplies the calculated reference value CRITERIA to the comparative judgment section 620. At step S205, the comparative judgment section 620 compares the obtained gain data G with the reference value CRITERIA to determine whether the gain data (hence the flying height) is abnormal. This determination step and the subsequent write processing step are the same as those for the first embodiment.

As described above, the present embodiment sets an appropriate reference value for each temperature, making it possible to provide an appropriate height margin for determining whether or not the flying height is normal based on the AGC gain and the reference value even when the flying height and hence the AGC gain change due to temperature changes. This arrangement effectively prevents occurrence of overkill at low temperatures as well as preventing the situation where an abnormality in the flying height fails to be detected at high temperatures.

According to the present embodiment, the reference value CRITERIA for a target temperature is calculated by use of an equation determined based on parameters registered in a reference value table, as described above. However, the reference value CRITERIA for a target temperature may be (directly) determined based on the reference value CRITERIA for each temperature registered in another reference table. For example, such a table may store information about a plurality of temperature ranges with a predetermined width and a reference value CRITERIA for each temperature range. By checking such a reference value table, the reference value determining section 680 determines a reference value CRITERIA corresponding to the temperature indicated by the temperature data obtained from the temperature detecting section 670.

Direct use of a reference value CRITERIA stored in the table allows the processing to be performed at higher speed. Further, the above arrangement that varies the reference value CRITERIA depending on the temperature can be applied to HDDs in which a single AGC gain value is compared with the reference value CRITERIA, as well as those described above in which a plurality of AGC gain values are used to determine whether the flying height is abnormal.

Another Embodiment

The first and second embodiments compare the gain set by the AGC controller 415 with a reference value. However, a HDD may be configured such that it includes a circuit for measuring the amplitude (the peak value) of the reproduced signal output from the AE 113 and compares the measured amplitude with a reference value.

Figure 15:
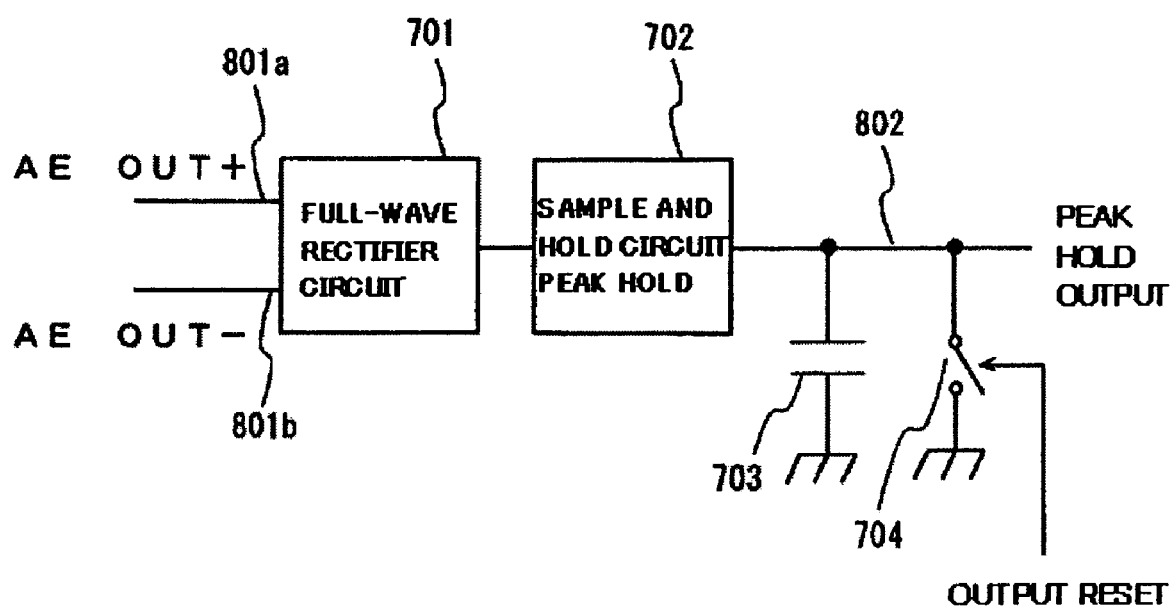
FIG. 15 is a diagram showing the configuration of the main portion of a measuring circuit for measuring the amplitude of a servo signal.

FIG. 15 is a diagram showing the configuration of the main portion of a measuring circuit for measuring the amplitude of a servo signal. As shown in the figure, the measuring circuit includes a full-wave rectifier circuit 701, a sample and hold circuit 702, a capacitor 703, and a reset switch 704. The two input terminals of the full-wave rectifier circuit 701 are connected to the positive and negative output terminals of the AE 113 through input lines 801$a$ and 801$b$, respectively. The output terminal of the sample and hold circuit 702 is connected to an A/D converter (not shown) through an output line 802. The capacitor 703 with one end grounded and the reset switch 704 are connected with the output line 802.

The full-wave rectifier circuit 701 converts the reproduced signal (AC signal) output from the AE 113 into a DC signal. The sample and hold circuit 702 samples the DC signal converted from the reproduced signal and thereby obtains the amplitude of the original reproduced signal. Specifically, when the reset switch 704 is on/off controlled, the sample and hold circuit 702 charges the capacitor 703 to the maximum voltage of the reproduced signal over a predetermined period of time, thereby outputting the peak value of the reproduced signal. This peak value is converted into a digital value by the A/D converter (not shown).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data storage device for determining whether a flying height of a head is normal, said data storage device comprising:
    a medium for storing data; and
    a head configured to float above said medium and move so as to access a storage area of said medium;
    a flying height data generating section configured to generate flying height data based on a read signal read out from said medium by said head, said flying height data indicating a flying height of said head;
    a storage device to store variable parameters;
    an evaluation value generating section configured to obtain a plurality of pieces of flying height data generated by said flying height data generating section and processing said plurality of pieces of flying height data based on said parameters stored in said storage device to generate an evaluation value; and
    a determining section configured to determine whether said evaluation value is within a predetermined range.

2. The data storage device as claimed in claim 1, further comprising:
    a write control section configured to inhibit a data write operation to said medium if said determing section has determined that said evaluation value is outside said predetermined range.

3. The data storage device as claimed in claim 1, further comprising:
    a variable gain amplifier configured to amplify said read signal to a constant output power;
    wherein said flying height data generating section generates said flying height data based on a gain set for said variable gain amplifier.

4. The data storage device as claimed in claim 3, wherein:
    said head sequentially outputs read signals each corresponding to one of a plurality of pieces of servo data read out from said medium; and
    said flying height data generating section generates said flying height data based on gains of said read signals each corresponding to one of said plurality of pieces of servo data.

5. The data storage device as claimed in claim 1, wherein said evaluation value generating section includes an FIR (Finite Impulse Response) filter which is set using said variable parameters.

6. The data storage device as claimed in claim 5, wherein said variable parameters include a number of taps of said FIR filter and a filter factor of each tap.

7. The data storage device as claimed in claim 5, wherein:
    said head sequentially outputs read signals each corresponding to one of a plurality of pieces of servo data read out from said medium;
    said flying height data generating section sequentially generates a plurality of said flying height data based on gains of said read signals each corresponding to one of said plurality of pieces of servo data; and
    said evaluation value generating section-processes said flying height data by use of said FIR filter to generate said evaluation value, said flying height data being sequentially generated by said flying height data generating section.

8. The data storage device as claimed in claim 1, further comprising:
    a temperature detecting section configured to detect a temperature; and
    a reference value generating section configured to generate a reference value corresponding to said temperature detected by said temperature detecting section;
    wherein said determining section determines whether said evaluation value is within a range specified by said reference value.

9. A data storage device comprising:
    a medium for storing data; and
    a head configured to float above said medium and move so as to access a storage area of said medium;
    a data generating section configured to generate data corresponding to a flying height of said head;
    a temperature detecting section configured to detect a temperature;
    a reference value generating section configured to calculate a reference value based on said temperature detected by said temperature detecting section; and
    a determining section configured, based on said generated data and said reference value, to determine whether said flying height of said head is normal.

10. The data storage device as claimed in claim 9, further comprising:
    a data write control section configured to inhibit a data write operation to said medium depending on said determination by said flying height determining section.

11. The data storage device as claimed in claim 10, wherein said write control section inhibits said data write operation to said medium if said flying height determining section has determined that said generated data is outside a range specified by said reference value.

12. The data storage device as claimed in claim 9, wherein said reference value generating section processes temperature data by use of a predetermined function to generate said reference value, said temperature data indicating said temperature detected by said temperature detecting section.

13. The data storage device as claimed in claim 12, wherein said function is a linear function of said temperature data which decreases with decreasing temperature.

14. The data storage device as claimed in claim 9, wherein said reference value generating section generates said reference value so as to compensate for an increase in said flying height due to a decrease in said temperature.

15. The data storage device as claimed in claim 9, further comprising:
 a variable gain amplifier configured to amplify a read signal to a constant output power, said read signal being read out from said medium by said head;
 wherein said data generating section generates said data based on a gain set for said variable gain amplifier.

16. The data storage device as claimed in claim 15, wherein:
 said head sequentially outputs a plurality of read signals each corresponding to one of a plurality of pieces of servo data read out from said medium; and
 said data generating section generates said data based on gains of said read signals each corresponding to one of said plurality of pieces of servo data.

17. A method for controlling a data storage device according to a flying height of a head which floats above a medium and moves so as to access a storage area of said medium, said method comprising:
 generating flying height data based on a read signal read out from said medium by said head, said flying height data indicating said flying height of said head;
 obtaining a plurality of pieces of generated flying height data and processing said plurality of pieces of flying height data based on preset variable parameters to generate an evaluation value; and
 determining whether said flying height is normal based on said evaluation value and a predetermined reference value.

18. The method as claimed in claim 17, further comprising:
 inhibiting a data write operation to said medium depending on a determination result of said determining step.

19. A method for controlling a data storage device, which determines whether a flying height of a head is normal, said head floating above a medium and moving so as to access a storage area of said medium, said method comprising:
 generating data corresponding to said flying height of said head;
 detecting a temperature;
 calculating a reference value based on said detected temperature; and
 based on said generated data and said reference value, determining whether said flying height of said head is normal.

20. The method as claimed in claim 19, further comprising:
 inhibiting a data write operation to said medium depending on a determination result of said determining step.

* * * * *

UNITED STATES PATENT AND TRADEMARK OFFICE
CERTIFICATE OF CORRECTION

PATENT NO. : 7,298,566 B2  
APPLICATION NO. : 11/064698  
DATED : November 20, 2007  
INVENTOR(S) : Ueda et al.

Page 1 of 1

It is certified that error appears in the above-identified patent and that said Letters Patent is hereby corrected as shown below:

<u>In the Claims</u>:
Claim 2, Column 17, Line 49, please delete "determing" and insert --determining--.

Claim 7, Column 18, Line 16, please delete "section - processing" and insert --section processing--.

Signed and Sealed this

Thirteenth Day of May, 2008

JON W. DUDAS  
*Director of the United States Patent and Trademark Office*